(12) United States Patent
Ishii

(10) Patent No.: US 6,952,509 B2
(45) Date of Patent: Oct. 4, 2005

(54) WAVELENGTH DISPERSION COMPENSATOR AND OPTICAL TRANSMISSION LINE

(75) Inventor: Satoshi Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/956,047

(22) Filed: Sep. 20, 2001

(65) Prior Publication Data
US 2002/0034360 A1 Mar. 21, 2002

(30) Foreign Application Priority Data

Sep. 21, 2000 (JP) .................................... 2000-287547

(51) Int. Cl.[7] ............................................... G02B 6/34
(52) U.S. Cl. ........................................ 385/37; 385/24
(58) Field of Search ..................... 385/37, 24; 359/337

(56) References Cited

U.S. PATENT DOCUMENTS 5,841,926 A * 11/1998 Takeuchi et al. ............ 385/123
6,137,604 A * 10/2000 Bergano ........................ 398/1
6,421,167 B1 * 7/2002 Cohen et al. ................ 359/337

* cited by examiner

Primary Examiner—John D. Lee
Assistant Examiner—Eric Wong
(74) Attorney, Agent, or Firm—McGinn & Gibb, PLLC

(57) ABSTRACT

In the WDM optical transmission, optical signals propagated through an optical transmission line are supplied to a circulator of a wavelength dispersion compensator. The optical signals supplied to an input terminal of the circulator are transmitted to an input and output terminal of the circulator, and inputted to fiber gratings of the reflection type. The optical signals having a specified wavelength is reflected by one of the fiber gratings, again inputted to the input and output terminal of the circulator, and transmitted to the output terminal of the same. Since the incident optical signals are reflected by the fiber gratings situated at different positions, there arises the difference in the time spent in traveling to and from the fiber grating between the optical signals. Accordingly, the wavelength dispersions of the optical signals can be compensated by suitably selecting the positions of the fiber gratings.

9 Claims, 9 Drawing Sheets

WAVELENGTH DISPERSION COMPENSATOR AND OPTICAL TRANSMISSION LINE

FIELD OF THE INVENTION

The invention relates to a wavelength dispersion compensator and an optical transmission line, and especially to a wavelength dispersion compensator and an optical transmission line using the aforementioned wavelength dispersion compensator.

BACKGROUND OF THE INVENTION

In the wavelength division multiplexed (WDM, hereinafter) optical communication, optical signals propagated through an optical transmission line (optical fibers) respectively undergo wavelength dispersions The wavelength dispersion is a kind of dispersion, and means that a shape of an optical pulse propagated through the optical fiber is deformed or broadened in various ways depending on a slight difference in the wavelength of the optical pulse, and group velocities of the respective optical signals take different values, chiefly because the refractive index of the optical fiber varies as a function of the wavelength of a light.

Accordingly, the wavelength dispersion is a primary factor of a limitation of the transmission distance of the optical communication system, or of a deterioration of the quality of the optical transmission caused by the distortion of the optical pulse. Especially, in the long distance transmission system using Erbium-doped fiber amplifiers, since the optical signal is propagated through the optical fiber without being converted into an electrical signal from the sending end to the receiving end, the wavelength dispersion caused in the total length of the transmission line is accumulated on the optical signal.

Moreover, in a case of the long distance transmission system such as the submarine optical transmission system or of a high bit rate transmission system, the effect of the accumulation of the wavelength dispersion becomes a serious problem. Accordingly, the effect of the wavelength dispersion must be compensated by taking some measures, and explaining concretely, the wavelength dispersion has been thus far compensated by inserting the dispersion compensation fiber into the optical transmission line, where the wavelength dispersion of the dispersion compensation fiber should have the same absolute value as and a sign opposite to that of the optical transmission line.

The structure of the optical transmission line using the dispersion compensation fiber is shown in FIG. 1. In general, the wavelength dispersion of the dispersion compensation fiber 110 and that of the optical fiber for the signal transmission 120 change in accordance with the wavelength of the optical signal. Accordingly, if the wavelength dispersion of the dispersion compensation fiber 11 has the same absolute value as and a sign opposite to that of the optical fiber for the signal transmission 120 independently of the wavelength, the wavelength dispersion of the optical signal must be compensated perfectly at any wavelength.

However, although it is possible to theoretically cancel the wavelength dispersion of the optical fiber for the signal transmission 120 by the wavelength dispersion compensation fiber 110 having the aforementioned characteristic, it has been impossible to actually provide the wavelength dispersion compensation fiber 110 which cancels the wavelength dispersions of the optical fiber for the signal transmission throughout all the channels of the WDM optical signals.

Herein, FIG. 2 shows a dispersion map of the optical signals in case that the dispersion compensation fibers having the positive wavelength dispersion are inserted into the optical transmission line composed of optical fibers for the signal transmission having the negative wavelength dispersion. As shown in FIG. 2, the wavelength dispersions of the optical signal $\lambda_1$ to $\lambda_5$ to are compensated by the dispersion compensation fibers, and approach zero at a certain interval of the transmission distance.

As seen from FIG. 2, although only the wavelength dispersion of the optical signal $\lambda_3$ return to zero whenever it is compensated by the dispersion compensation fibers, those of the other optical signals $\lambda_1$, $\lambda_2$, $\lambda_4$, $\lambda_5$, do not return to zero even when they are compensated by the same, because the wavelength dispersions of the optical signals vary as functions of the wavelengths of the optical signals, and thereby the wavelength dispersions are accumulated on the optical signals depending on the transmission distance.

That is to say, although the conventional dispersion compensation fiber can compensate the accumulated wavelength dispersion satisfactory only when it is limited within a certain value, it cannot return the accumulated wavelength dispersion exceeding the certain limit to zero. Namely, the range of the accumulated wavelength dispersion which can be satisfactorily compensated by the conventional dispersion compensation fiber is limited.

Moreover, following disadvantages are pointed out on the conventional dispersion compensation fiber. That is to say, an insertion loss of the conventional dispersion compensation fiber becomes large as the wavelength dispersion to be compensated becomes large. The dispersion compensation fiber necessitates a length which is proportional to the length of the optical transmission line, and the weight thereof becomes large. Accordingly, it becomes difficult to make the dispersion compensator using the conventional wavelength dispersion compensation fiber and devices concerned therewith compact and lightweight, and to reduce consumed electric power and the cost price thereof.

Although it can be considered that the accumulated wavelength dispersions are compensated in the lump at the transmitting and receiving terminals (not shown), since the accumulated wavelength dispersion exceeding a certain value cannot be compensated similarly to the conventional dispersion compensation fiber, it is impossible to compensate the accumulated wavelength dispersions throughout all the cannels of the WDM optical signals.

SUMMARY OF THE INVENTION

Accordingly, it is an object of the invention to provide a wavelength dispersion compensator and an optical transmission line in which a wavelength dispersion can be compensated throughout a wide range by a wavelength dispersion compensator having a simple structure, a wavelength dispersion compensator can be made compact, consumed electric power can be reduced, and a quality of a transmission of an optical transmission line can be heightened.

According to the first feature of the invention, a wavelength dispersion compensator for compensating wavelength dispersions of WDM optical signals which have been propagated through an input optical transmission line, comprises:

plural fiber gratings of a refection type which reflect the WDM optical signals at different positions depending on wavelengths of the reflected optical signals.

The wavelength dispersion compensator mentioned in the above corresponds to claim 1.

If the wavelength dispersion compensator having the aforementioned structure is adopted, since the incident optical signals are reflected by the fiber gratings of the reflection type at different positions depending on the wavelengths of the reflected optical signals, there arises a difference in the time spent in travelling to and from the fiber grating of the reflection type between the reflected optical signals, and thereby the wavelength dispersions of the optical signals can be compensated. Accordingly, since the plural optical signals, the wavelength dispersions of which are satisfactorily compensated, are transmitted on the optical transmission line, the quality of the signal transmission of the optical transmission line can be heightened. Moreover, since the weight of the fiber gratings of the reflection type is lighter than that of the conventional wavelength dispersion compensation fiber, and the length of the former is shorter that of the latter, the wavelength dispersion compensator according to the invention can be made compact and lightweight, and the cost price thereof can be cut down.

In the wavelength dispersion compensator according to claim 2, the wavelength dispersion compensator further comprises a circulator, an input terminal of which is connected with the input optical transmission line, an input and output terminal of which is communicated with the plural fiber gratings of a reflection type, and an output terminal of which is connected with an output optical transmission line or an output optical waveguide.

If the wavelength dispersion compensator having the aforementioned structure is adopted, the wavelength dispersion compensator can be fabricated simply by combining the circulator with the plural fiber gratings of the reflection type, and thereby the wavelength dispersions of the plural optical signals propagated throughout the input optical transmission line can be compensated.

In the wavelength dispersion compensator according to claim 3, each of the plural fiber gratings of the reflection type is formed of a chirped fiber grating of the reflection type.

If the wavelength dispersion compensator having the aforementioned structure is adopted, since the chirped fiber grating of the reflection type which can be used at any wavelength or can compensate any amount of the wavelength dispersion can be fabricated, and the chirped fiber grating of the reflection type has such a feature that the wavelength of the reflected optical signal varies continuously as a function of a longitudinal distance, the wavelength dispersion compensator according to the invention can compensated the wavelength dispersions throughout a wide range of the wavelength.

In the wavelength dispersion compensator according to claim 4, the wavelength dispersion compensator further comprises a gain equalizer, wherein:

an input terminal of the gain equalizer is connected with the output terminal of the circulator, and an output terminal of the gain equalizer is connected with the output optical transmission line or the output optical waveguide.

If the wavelength dispersion compensator having the aforementioned structure is adopted, unevenness of the levels of the optical signals reflected from the plural fiber gratings of the reflection type can be equalized. Accordingly, the accumulated wavelength dispersion of the optical signals can be compensated and the signal levels of the same can be equalized by the wavelength dispersion compensator according to the invention.

In the wavelength dispersion compensator according to claim 5, the wavelength dispersion compensator further comprises a series connection of an optical repeater and a gain equalizer, wherein:

an input terminal of the optical repeater is connected with the output terminal of the circulator, an input terminal of the gain equalizer is connected with an output terminal of the optical repeater, and an output terminal of the gain equalizer is connected with the output optical transmission line or the output optical waveguide.

If the wavelength dispersion compensator having the aforementioned structure is adopted, some of the optical signals reflected from the fiber gratings of the reflection type, powers of which are lower than their rated powers assigned by the level diagram, can be amplified by the optical repeater to achieve their regular values.

Moreover, since the gain equalizer is connected in series with the optical repeater, the accumulated wavelength dispersions of the respective optical signals are compensated, the powers of the same are amplified, and the signal levels of the same are equalized. Accordingly, the quality of the signal transmission of the optical transmission line can be heightened.

According to the second feature of the invention, the optical transmission line according to claim 6 comprises:

plural wavelength dispersion compensators, each of which compensates a wavelength dispersion of a single optical signal, a demultiplexing arrayed waveguide grating (AWG, hereinafter) which demultiplexes WDM optical signals into plural optical signals, and supplies them to the plural wavelength dispersion compensators respectively, and a multiplexing AWG which multiplexes the plural optical signals respectively outputted from the plural wavelength dispersion compensators, wherein each of the plural wavelength dispersion compensators comprises:

a fiber grating of the reflection type for reflecting one of the plural optical signals, and a circulator, an input terminal of which is communicated with the demultiplexing AWG, an input and output terminal of which is communicated with the fiber grating of the reflection-type, and an output terminal of which is communicated with the multiplexing AWG, wherein optical distances between the fiber gratings of the reflection type and the corresponding circulators take different values depending on wavelengths of the reflected optical signals in the plural wavelength dispersion compensators.

If the optical transmission line having the aforementioned structure is adopted, since the plural wavelength dispersion compensators are respectively provided for the plural optical signals obtained by demultiplexing the WDM optical signals, the wavelength dispersions can be compensated throughout a wide range of the wavelength.

In the optical transmission according to claim 7, the fiber grating of the reflection type of each of the plural wavelength dispersion compensators is formed of a chirped fiber grating of the reflection type.

The advantage of this structure is similar that of the wavelength dispersion compensator according to claim 3.

In the optical transmission line according to claim 8, the optical transmission line further comprises gain equalizers, wherein:

input terminals of the gain equalizers are respectively connected with the output terminals of the circulators, and output terminals of the gain equalizers are respectively communicated with the multiplexing AWG.

The advantage of this structure is similar to that of the wavelength dispersion compensator according to claim 4.

In the optical transmission line according to claim 9, the optical transmission line further comprises optical repeaters connected with gain equalizers in series, wherein:

input terminals of the optical repeaters are respectively connected with the output terminals of the circulators, output terminals of the optical repeaters are respectively connected with input terminals of the gain equalizers, and output terminals of the gain equalizers are respectively communicated with the multiplexing AWG.

The advantage of this structure is similar to that of the wavelength dispersion compensator according to claim 5.

In the optical transmission line according to claim 10, further comprises Co doped fibers inserted between the wavelength dispersion compensators and the multiplexing AWG.

If the optical transmission line having the aforementioned structure is adopted, since some of the optical signals outputted from the plural wavelength dispersion compensators, each having a high signal level, are propagated through the Co fibers and undergo insertion losses, the levels of the respective optical signals are equalized.

In the optical transmission line according to claim 11, further comprises optical amplifiers respectively inserted between the wavelength dispersion compensators and the multiplexing AWG.

If the optical transmission line having the aforementioned structure is adopted, since the optical signals, the accumulated wavelength dispersions of which are respectively compensated by the plural wavelength dispersion compensators, are so amplified by the optical amplifiers that the peak levels of the optical signals are equalized, and the outputs of the optical amplifiers are supplied to the multiplexing AWG, the deflections of the respective signal levels can be corrected easily.

BRIEF DESCRIPTION OF THE DRAWINGS

The invention will be explained in more detail in conjunction with appended drawings, wherein.

DESCRIPTION OF PREFERRED EMBODIMENTS

Hereafter, preferred embodiments of the invention will be explained referring to the appended drawings.

[Structure of Wavelength Dispersion Compensator]

First, a wavelength dispersion compensator according to the preferred embodiment of the invention will be explained referring to FIG. 3. This drawing shows an internal structure of the wavelength dispersion compensator according to the invention.

Figure 3:
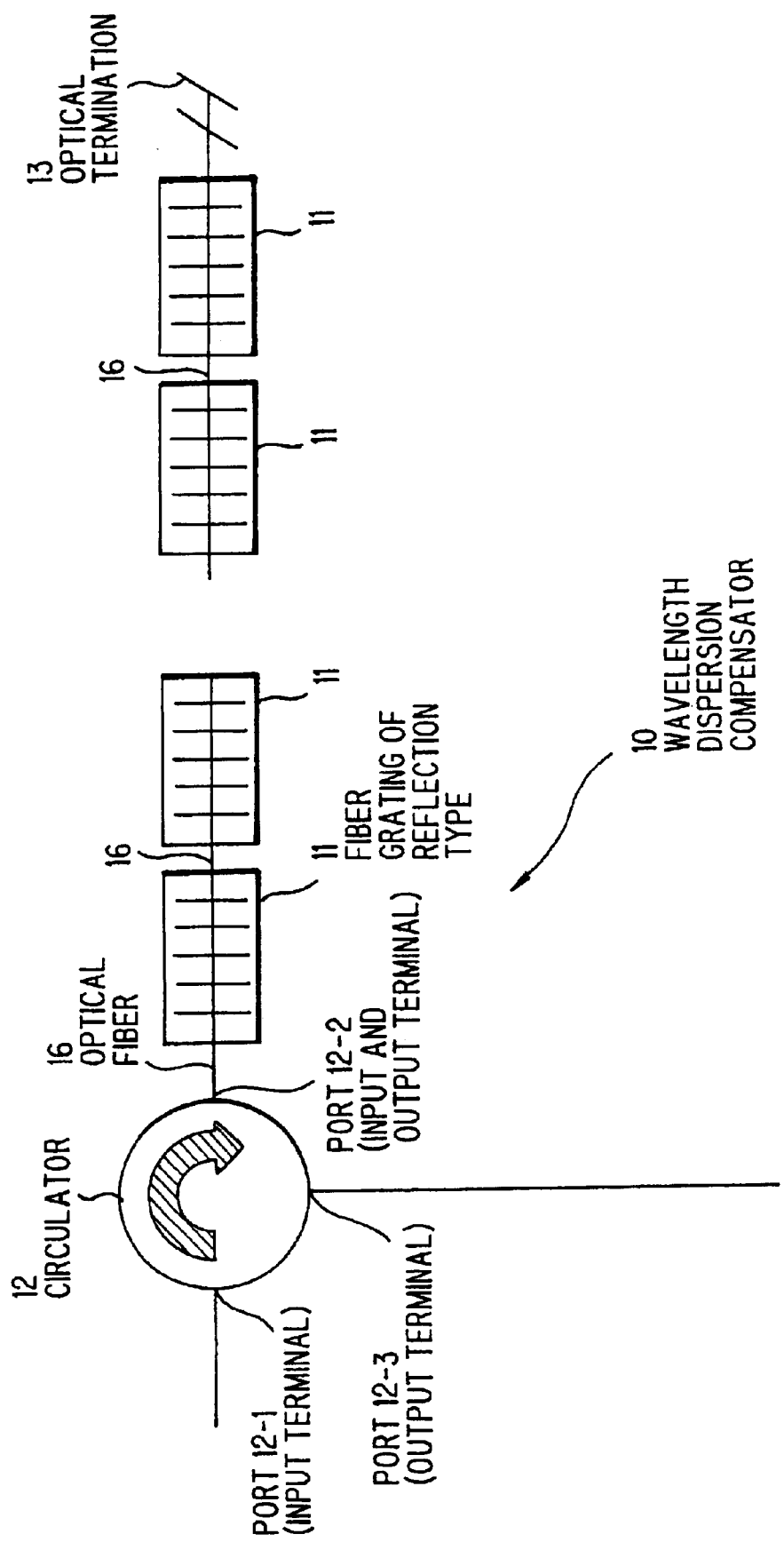
FIG. 3 shows a structure of a wavelength dispersion compensator according to the invention schematically.

As shown in FIG. 3, the wavelength dispersion compensator 10 according to the invention is composed of plural fiber gratings of the reflection type 11 and a circulator 12. Herein, the fiber grating of the reflection type 11 is formed of an optical fiber, the refractive index of which varies periodically as a function of the longitudinal distance, and the period of variation of the refractive index is less than 1 μm. According to the aforementioned structure, the fiber grating of the reflection type 11 functions as a band rejection filter having an extremely narrow band width. That is to say, the fiber grating of the reflection type 11 shown in FIG. 3 reflects an incident optical signal having a specified wavelength in the opposite direction, and the other optical signals pass therethrough without hindrance.

The wavelength of the optical signal reflected by the fiber grating of the reflection type 11 is given by the following equation.

$$\lambda_5 = 2 n_{eff} A \ (\mu m).$$

wherein $\lambda_5$: the wavelength of the reflected optical signal, $n_{eff}$: the effective refractive index of the optical fiber forming the fiber grating, and A: a coefficient determined by a variation of the refractive index of the optical fiber forming the fiber grating (μm).

In the above equation, when the fiber grating of the reflection type 11 is used in the 1.55 μm band, A is about 0.5 μm. Accordingly, the fiber grating of the reflection type 11 serves as a band rejection filter having a center wavelength of $\lambda_5$ and a band width of about 1 nm or below.

The number of the fiber gratings of the reflection type 11 is the same as that of the optical signals. The fiber gratings of the reflection type 11 are connected in cascade by an optical fiber 16 or an optical wave guide, and an input end (the left end) of the optical fiber 16 is connected with a port 12-2 (an input and output terminal) of the circulator 12. As seen from FIG. 3, since the optical signals are respectively reflected by the fiber gratings of the reflection type 11 which are situated at different positions depending on the wavelengths of the optical signals to be reflected, in other words, since the length of time in which the optical signal travels from the fiber grating of the reflection type 11 to the circulator 12 varies depending on the wavelength of the reflected optical signal, the wavelength dispersions accumulated on the plural optical signals can be compensated satisfactorily by suitably determining the positions of the fiber gratings of the reflection type 11.

Furthermore, in case that the fiber gratings of the reflection type 11 is used in the wavelength dispersion compensator 10, it is necessary to design the amount of variation of the refractive index, the period of the same, and the total length of this device should be determined so that the fiber grating of the reflection type 11 meets the characteristics required thereto.

Moreover, a chirped fiber grating (not shown) may be applied to the fiber grating of the reflection type 11. The chirped fiber grating is a kind of the fiber grating of the reflection type 11, in which the period of variation of the refractive index of the fiber varies as a function of the longitudinal distance. According to the aforementioned structure, since the center wavelength of the reflection band varies continuously depending on the period of variation of the refractive index, the band width of the chirped fiber grating becomes wider than that of the ordinary fiber grating, and the band width of several to several tens nm can be obtained.

In case that the chirped fiber grating is applied to the wavelength dispersion compensator, the number of the chirped fiber grating is the same as that of the optical signals, and the chirped fiber gratings are connected in cascade by an optical fiber or an optical waveguide similarly to the ordinary fiber gratings of the reflection type 11. Each optical signal is reflected by the corresponding chirped fiber grating of the reflection type situated at an appropriate position, and its wavelength dispersion is compensated.

The function of the circulator 12 is used in the optical circuit shown in FIG. 3 is similar to that used in a microwave circuit, and the port 12-1 (an input terminal), the port 12-2 (an input and output terminal), and the port 12-3 (an output terminal) are arranged symmetrically therearound. In case that the optical signal is transmitted between the adjacent terminals, if the direction of the propagation of the optical signal coincides with an arrow on the circulator 12 (from the port 12-1 to the port 12-2, from the port 12-2 to the port 12-3, from the port 12-3 to the port 12-1), the insertion loss of the optical signal is quite low. On the other hand, if the direction of the propagation of the optical signal is opposite to the arrow, the insertion loss of the optical signal is extremely high. Although the circulator 12 having the three terminals is applied to the wavelength dispersion compensator shown in FIG. 3, the circulator having the four or more terminals may be applied thereto. In FIG. 3, the optical signal reflected from the waveguide gratings of the reflection type 11 again in inputted to the port 12-2 (the input and output terminal) of the circulator 12, and transmitted to the output optical transmission line via the port 12-3 (the output terminal) of the circuit 12.

Figure 4:
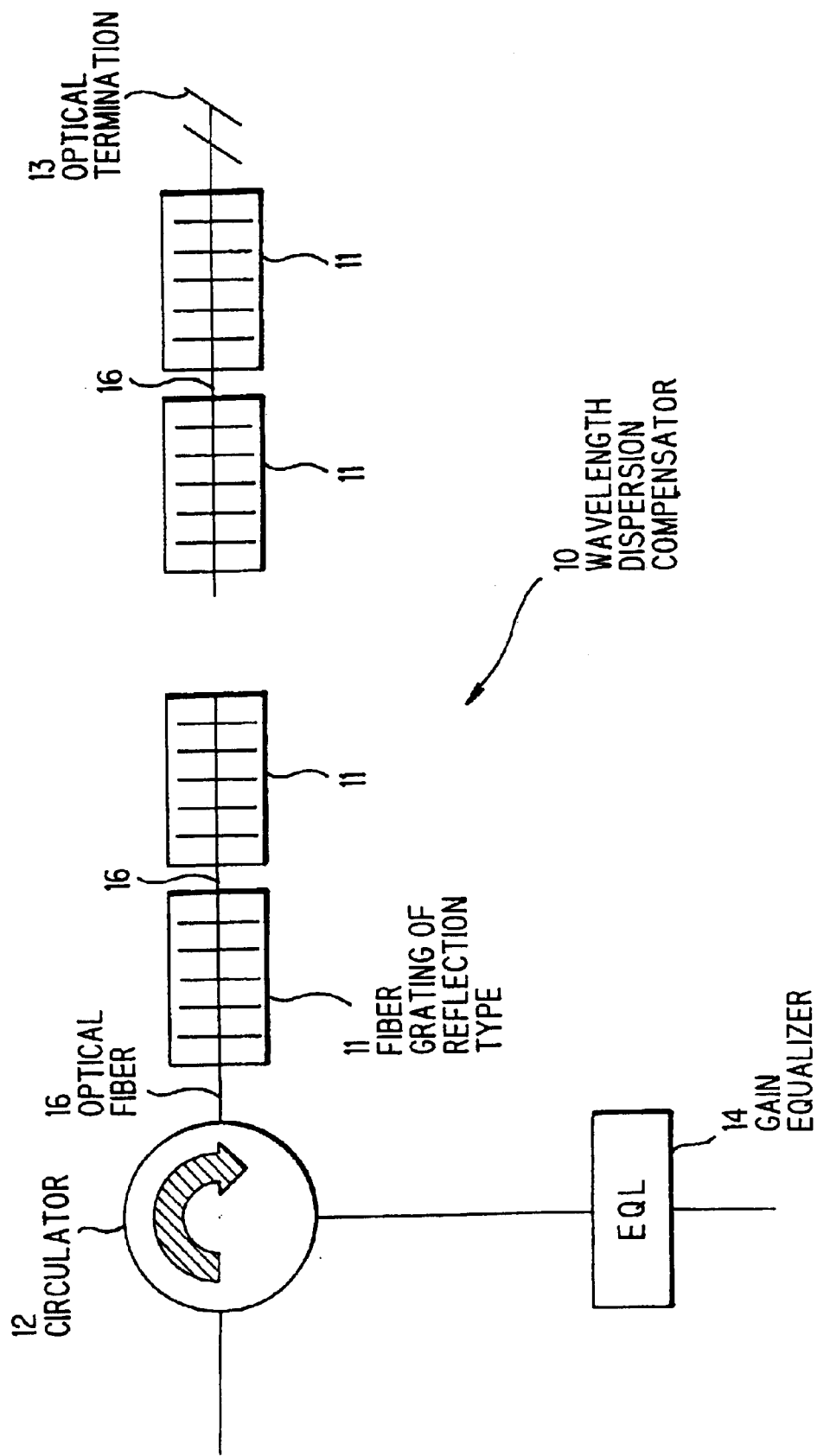
FIG. 4 shows a structure of another wavelength dispersion compensator according to the invention schematically.

In the wavelength dispersion compensator 10 shown in FIG. 4, a gain equalizer 14 may be connected with the port 12-3 (the output terminal) of the circulator 12 via an optical fiber or an optical waveguide. The gain equalizer 14 equalizes unevenness of the optical signal levels, which take different values depending on the wavelengths of the optical signals. Since the respective optical signals undergo different transmission losses which take different values depending on the wavelengths of the optical signals while they propagate through the optical fiber for transmission 30, the levels of the optical signals are lowered ununiformaly.

Accordingly, if the gain equalizer 14 is added to the wavelength dispersion compensator 10, unevenness of the levels of the optical signals which are propagated through the optical fiber for the signal transmission 30 and reflected by the fiber gratings of the reflection type 11 are equalized by the gain equalizer 14, and the optical signals outputted form the gain equalizer 14 can be supplied to the optical transmission line 1.

As mentioned in the above, the wavelength dispersion compensator 10 shown in FIG. 4 completes equalization of the levels of the optical signals as well as the dispersion compensations of the same. Since the aforementioned wavelength dispersion compensator 10 can supply the optical signals, in which unevenness of the levels thereof are equalized and the wavelength dispersions accumulated thereon are compensated, to the optical transmission line 1, the quality of the signal transmission of the optical transmission line 1 can be heightened.

Figure 5:
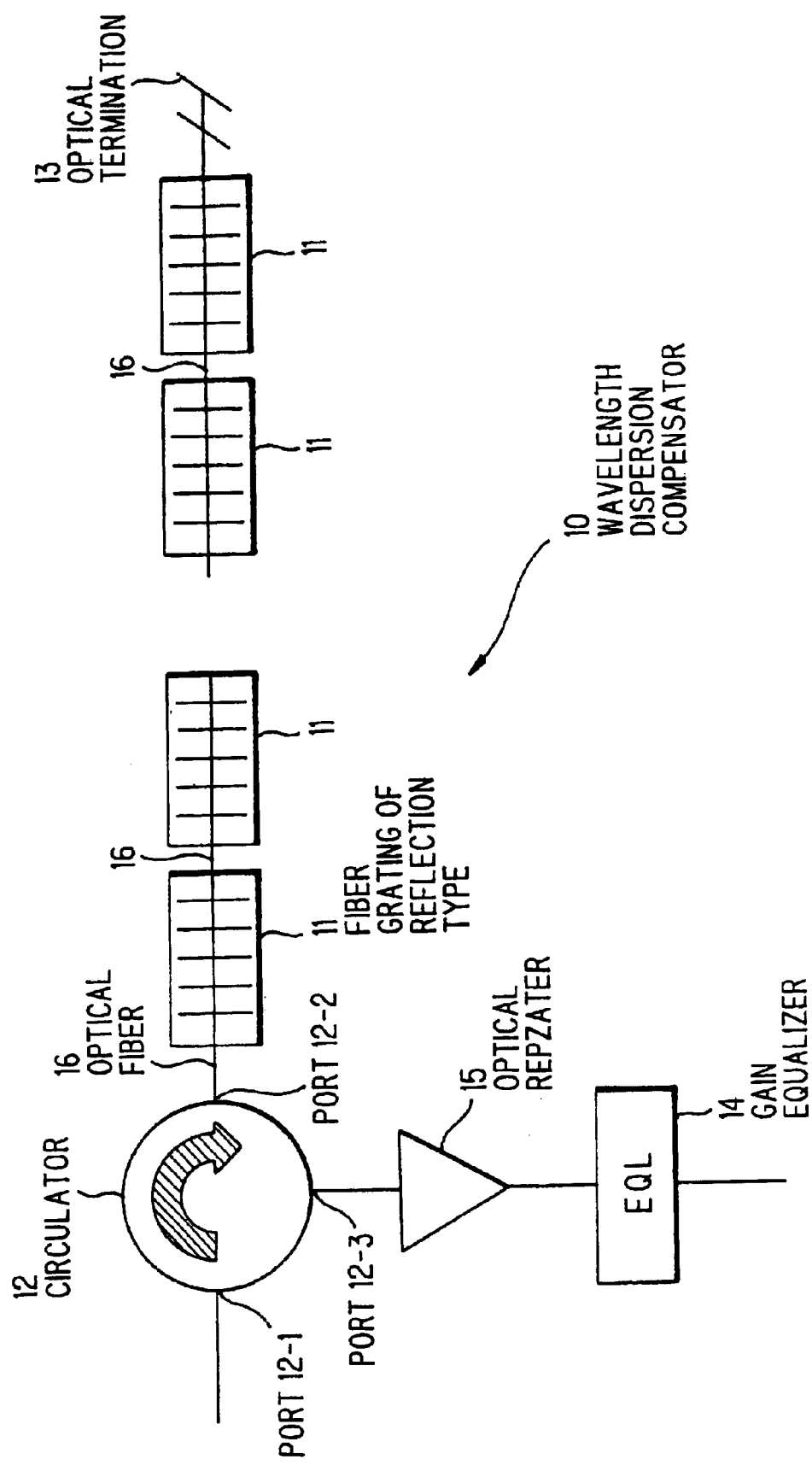
FIG. 5 shows a structure of the other wavelength dispersion compensator according to the invention schematically.

Moreover, as shown in FIG. 5, a series connection of an optical repeater 15 and a gain equalizer 14 may be added to the wavelength dispersion compensator 10 at the port 12-3 (the output terminal) of the circulator 12 via an optical fiber or an optical it waveguide. By providing the optical repeater 15 for the wavelength dispersion compensator 10, some of the optical signals reflected from the fiber gratings of the reflection type 11, powers of which are lower than their rated values assigned by the level diagram, are amplified by the optical repeater 15 to achieve their regular values.

Accordingly, in the wavelength dispersion compensator 10, the wavelength dispersions of the optical signals can be compensated, the powers of the optical signals are compensated to achieve their regular values assigned by the level diagram, and their signal levels are equalized. Moreover, since the optical signals in which their powers are compensated and their signal levels are equalized can be transmitted, the quality of the signal transmission of the optical transmission lines can be heightened.

Next, the operation of the wavelength dispersion compensator will be explained referring to FIG. 3. In the WDM optical transmission, the optical signals propagated through the optical transmission line 1 mentioned later are supplied to the circulator 12 of the wavelength dispersion compensator 10.

The optical signals inputted to the port 12-1 of the circulator 12 are transmitted to the port 12-2, and supplied to the fiber gratings of the reflection type 11. In the wavelength dispersion compensator 10 shown in FIG. 3, the optical signal having a specified wavelength is reflected by one of the plural fiber gratings of the reflection type 11, again inputted to the port 12-2 (the input and output terminal), and outputted from the port 12-3 (the output terminal) to the optical transmission line. Since the fiber gratings of the reflection type 11 are situated at the different positions, there arises a difference in the time spent in traveling to and from the fiber grating of the reflection type 11 between the optical signals. Accordingly, the wavelength dispersions of the optical signals can be satisfactorily compensated by suitably determining the positions of the fiber gratings of the reflection type 11.

Figure 6:
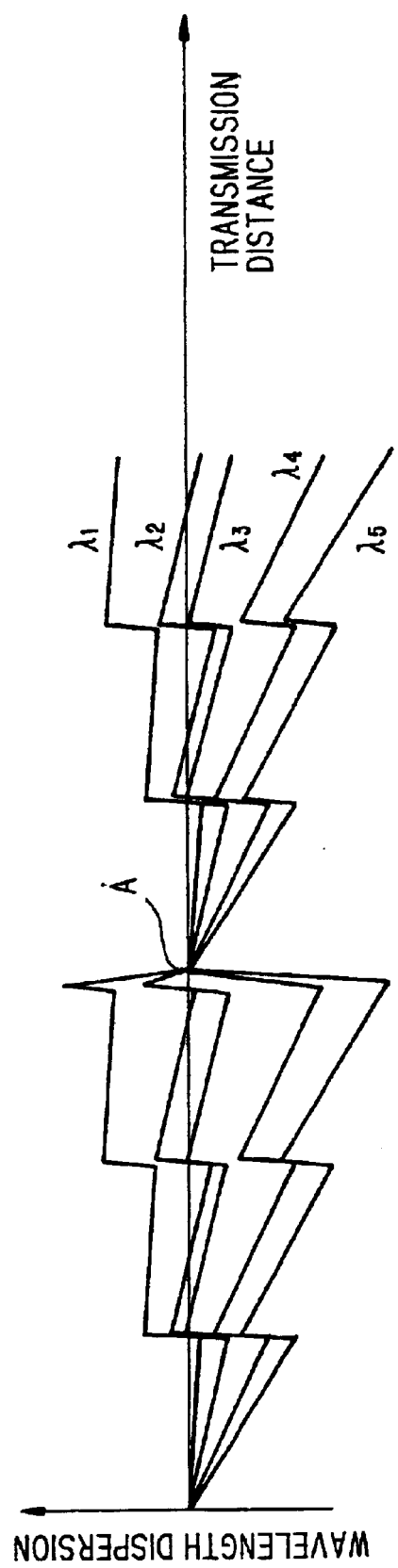
FIG. 6 is a diagram for showing wavelength dispersions of optical signals in an optical transmission line using a wavelength dispersion compensator according to the invention as functions of a transmission distance.

As mentioned later, the optical signal $\lambda_1$ to $\lambda_5$ are transmitted from the optical transmitter (OS) 20 situated at the sending end, and the wavelength dispersions of the optical signals are compensated by the wavelength dispersion compensator 10 in the lump. FIG. 6 shows a dispersion map of the aforementioned system, and the wavelength dispersions of the optical signals $\lambda_1$ to $\lambda_5$ are represented as functions of the transmission distance. As shown in FIG. 6, zigzag lines representing the wavelength dispersions of the respective optical signals coverage at a point A, which corresponds to the position of the wavelength dispersion compensator 10. It should be noted that the wavelength dispersions of the all the optical signals $\lambda_1$ to $\lambda_5$ become zero at the point A.

Figure 1:
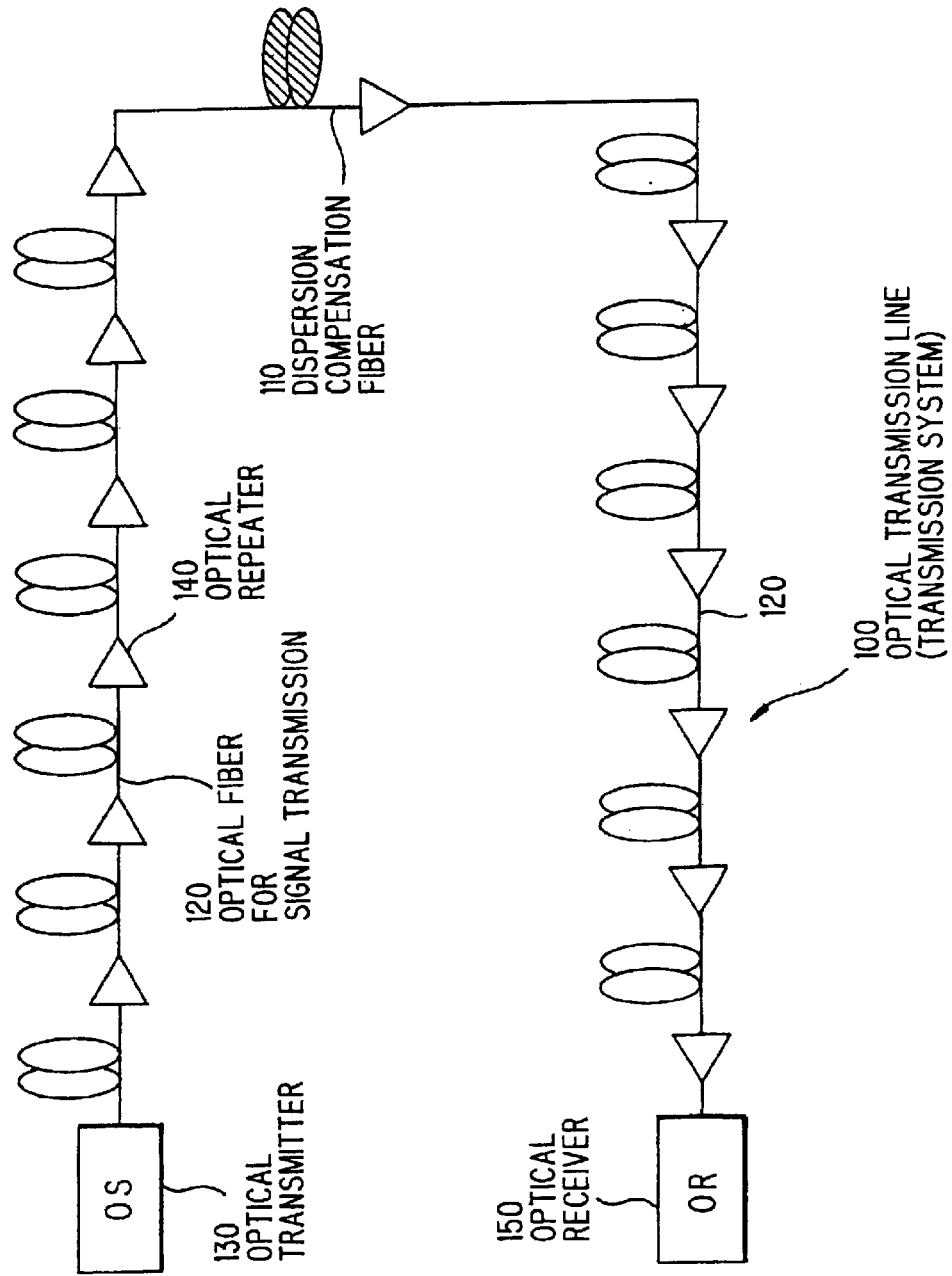
FIG. 1 shows a structure of a conventional optical transmission line schematically.
Figure 2:
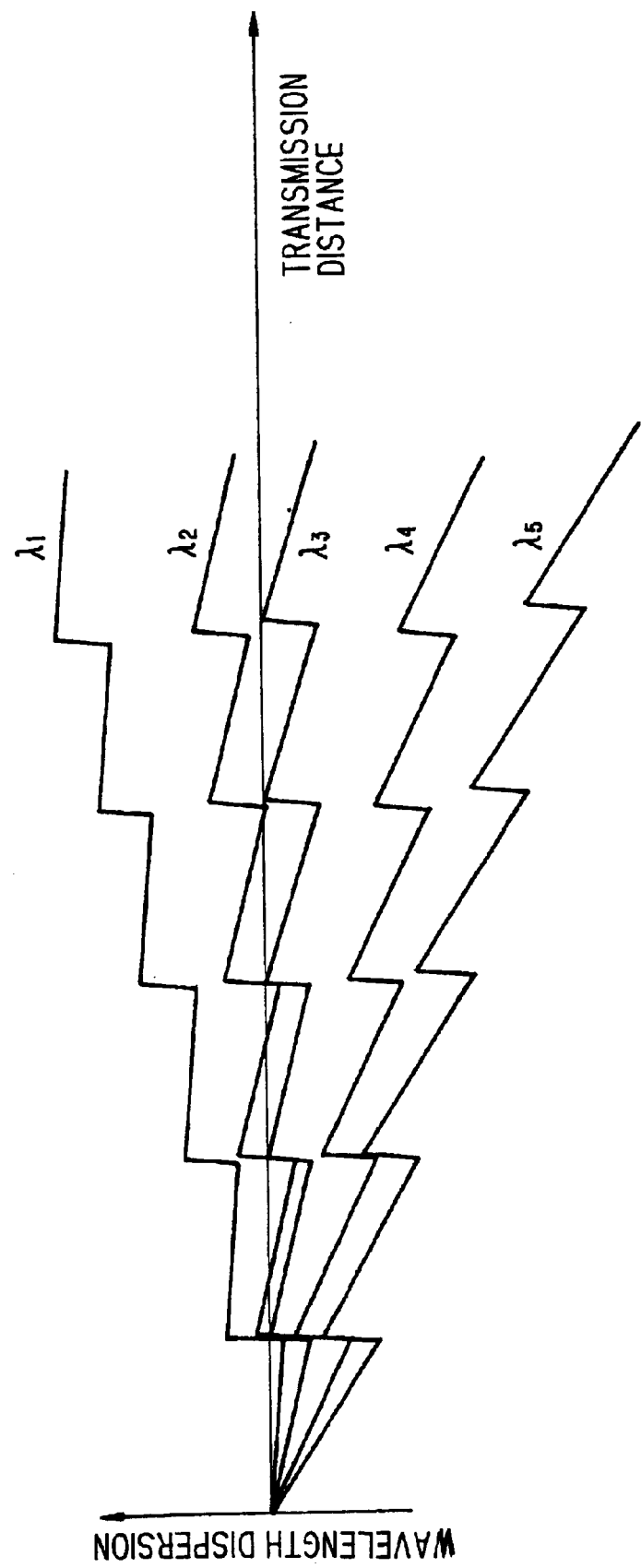
FIG. 2 is a diagram for showing accumulated wavelength dispersions of optical signals in a conventional optical transmission line as functions of a transmission distance.

When the dispersion map shown in FIG. 2 is compared with that shown in FIG. 6, it can be clearly understood that the wavelength dispersion compensator 10 according to the invention keeps the wavelength dispersions of the optical signals within a far narrower range than that of the conventional optical transmission system throughout a wide range of the wavelength. Accordingly, when the wavelength dispersion compensator 10 is applied to the optical transmission system, the optical signals can be transmitted under the low wavelength dispersions, and the quality of the signal transmission can be heightened.

[Optical Transmission Lines According to Referred Embodiments of Invention]

Figure 7:
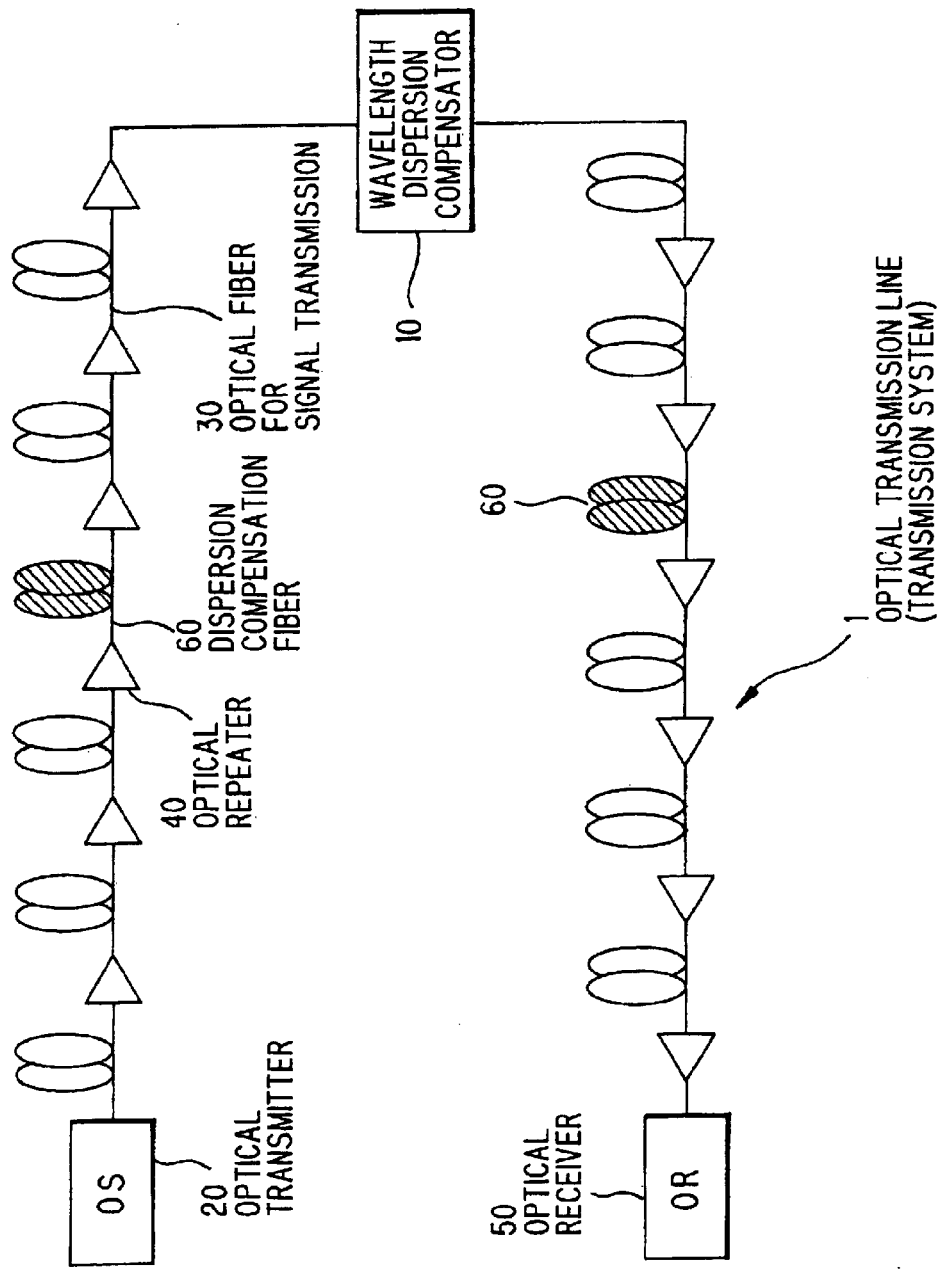
FIG. 7 shows a structure of an optical transmission line according to the invention schematically.

Next, an optical transmission line according to the invention will be explained referring to FIG. 7. FIG. 7 shows a structure of the optical transmission line according to the preferred embodiment of the invention schematically. As shown in this drawing, the optical transmission line 1 is composed of an optical transmitter (OS) 20, an optical fiber for a signal transmission 30, optical repeaters 40, and an optical receiver (OR) 50. Furthermore, a wavelength dispersion compensator 10 is added thereto.

In the optical transmission line 1, dispersion compensation fibers 60 may be inserted into the optical fiber for the signal transmission 30 in series at predetermined positions on the route thereof. In the optical transmission line 1, the wavelength dispersions of the optical signals can be compensated surely by using the wavelength dispersion compensator 10 in combine with the dispersion compensation fibers 60.

Moreover, the optical signals transmitted from the optical transmitter (OS) 20 can be transmitted to the optical receiver (OR) 50 after the wavelength dispersions thereof have been compensated in the wavelength dispersion compensator 10 by providing the wavelength dispersion compensator 10 for the optical transmission line 1. Accordingly, the quality of the signal transmission of the optical transmission line 1 can be heightened. The structure of the wavelength dispersion compensator 10 can be selected from those shown in FIGS. 3 to 5.

Figure 8:
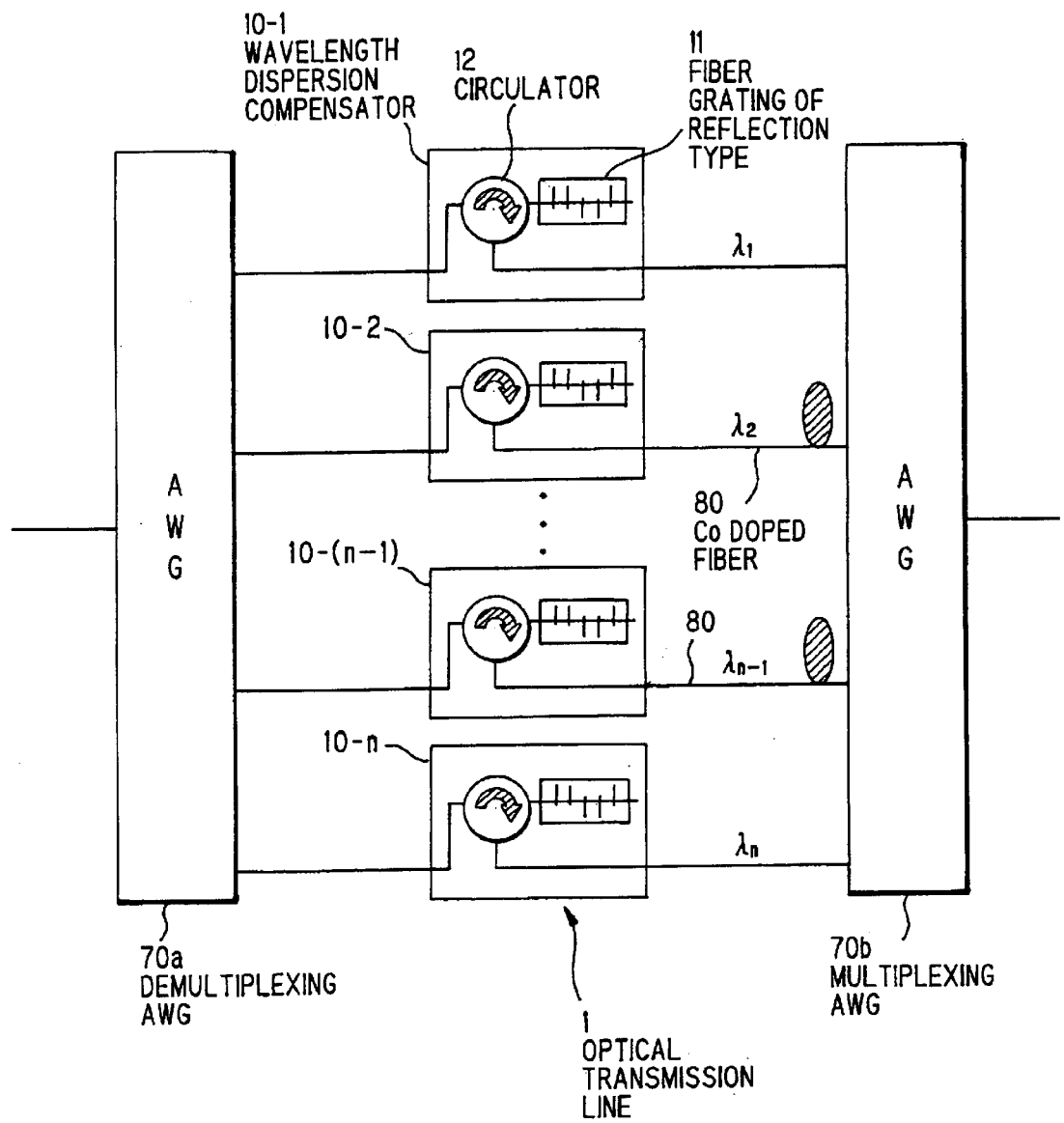
FIG. 8 shows a structure of another optical transmission line according to the invention schematically.

Moreover, as shown in FIG. 8, the optical transmission line 1 may be provided with a demultiplexing arrayed waveguide grating (AWG, hereinafter) 70a and a multiplexing AWG 70b. The plural wavelength dispersion compensators 10-1 to 10-n connected in parallel are inserted between the demultiplexing AWG 70a and the multiplexing AWG 70b.

Herein, each of the demultiplexing AWG 70a and the multiplexing AWG 70b is composed of the waveguides which are arranged thereon by depositing $SiO_2$ on a Si substrate and arranged thereon to form an array. According to the aforementioned structure, since the diffraction angle of the optical signal in the slab waveguide varies as a function of the wavelength of the optical signal similarly to the diffraction gratings, the demultiplexed optical signals can be taken out from the output waveguides.

Each of the wavelength dispersion compensators 10-1 to 10n corresponds to one of the WDM optical signals diffracted by the demultiplexing AWG 70a. Accordingly, the wavelength dispersions of the WDM optical signals can be compensated throughout a wide range of the wavelength by the wavelength dispersion compensators 10-1 to 10-n as a whole. It should be noted that, although each of the dispersion compensators 10-1 to 10-n is provided with a single fiber grating of the reflection type 11, optical distances between the fiber gratings of the reflection type 11 and the corresponding circulators 12 take different values depending on the wavelengths of the reflected optical signals in the plural wavelength dispersion compensators 10-1 to 10-n.

In the optical transmission line 1 provided with the demultiplexing AWG 70a and the multiplexing AWG 70b, Co doped fibers 80 may be inserted between the wavelength dispersion compensators 10-1 to 10-n and the multiplexing AWG 70b. The Co doped fibers 80 are inserted between the wavelength dispersion compensators 10-2 to 10-(n−1) outputting the optical signals having high signal levels and the multiplexing AWG 70b.

If the optical transmission line 1 having the structure shown in FIG. 8 is adopted. since some of the optical signals outputted from the wavelength dispersion compensators 10-1 to 10-n, each having a high signal level, are propagated through the Co doped fibers 80 and undergo insertion losses, the levels of the optical signals to be multiplexed by the multiplexing AWC 70b can be equalized.

Figure 9:
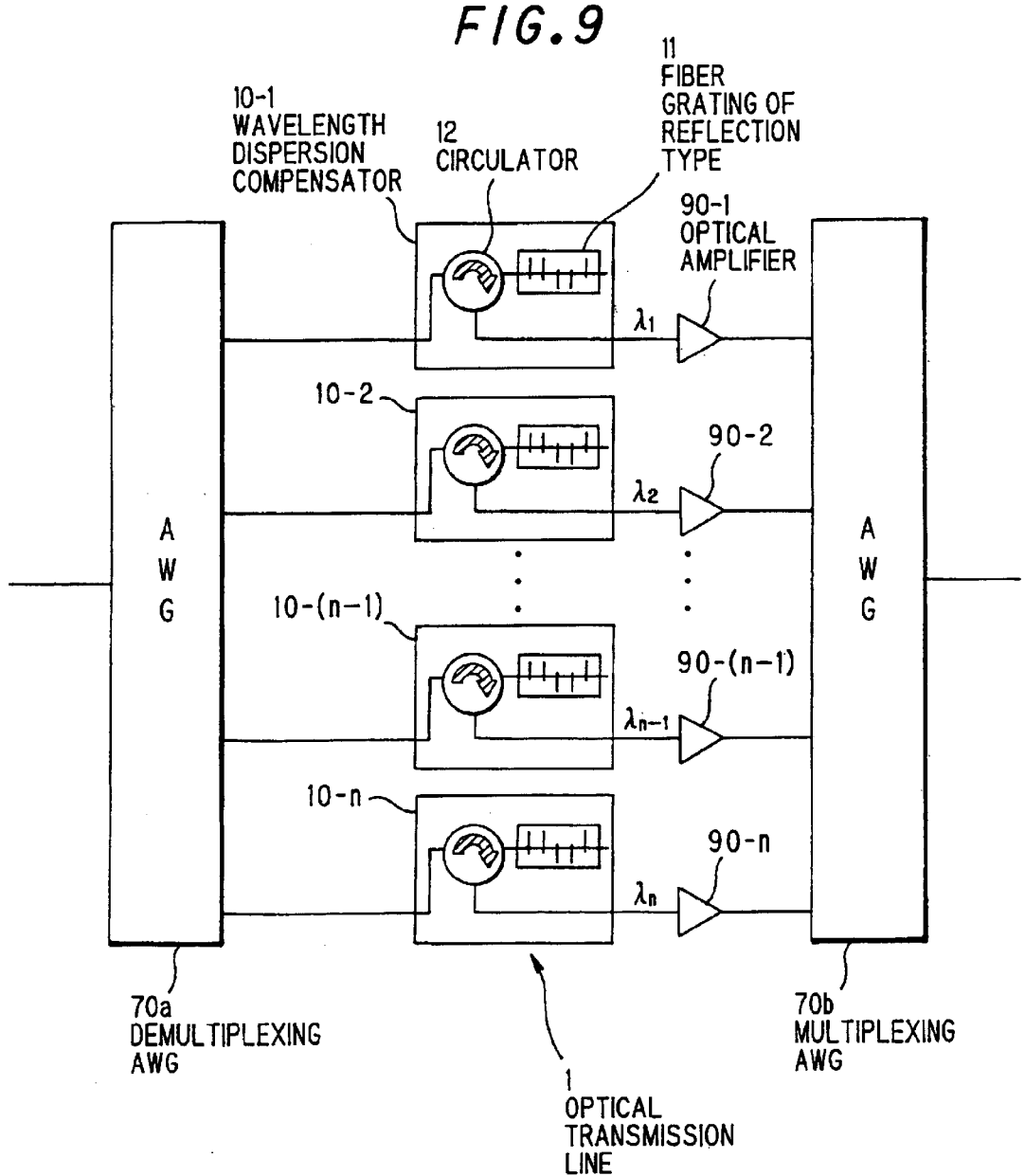
FIG. 9 shows a structure of the other optical transmission line according to the invention schematically.

Moreover, in the optical transmission line 1 shown in FIG. 9, the optical amplifiers 90-1 to 90-n may be inserted between the output terminals of the wavelength dispersion compensators 10-1 to 10-n and the multiplexing AWG 70b respectively.

If the optical transmission line is constructed in the structure shown in FIG. 9, the optical signals outputted from the wavelength dispersion compensators 10-1 to 10-n can be so amplified by the optical amplifiers 90-1 to 90-n that the peak levels of the optical signals are equalized. According to the aforementioned structure, deflections of the signal levels in the respective channels can be corrected easily.

As mentioned in the above, according to the invention, in the fiber gratings of the reflection type provided for the wavelength dispersion compensator, since the optical signals are reflected from the different positions depending on the wavelengths of the incident optical signals, the wavelength dispersions of the respective optical signals can be compensated because of the difference in the time spent in travelling to and from the fiber gating of the reflection type between the optical signals. Accordingly, since the optical signals, the wavelength dispersions of which are satisfactorily compensated, are transmitted to the optical receiver, the quality of the signal transmission of the optical transmission line can be heightened.

Since the weight of the fiber gratings of the reflection type is less than that of the conventional dispersion compensation fiber and the length thereof can be made short, the wavelength dispersion compensator becomes compact and lightweight, and the cost price thereof can be reduced. The wavelength dispersions of the optical signals can be compensated by a simple structure by providing the fiber gratings of the reflection type and the circulator for the wavelength dispersion compensator.

The fiber grating of the reflection type can be fabricated for the optical signal having a wavelength selected at will and a wavelength dispersion to be compensated having any desired value. Moreover, the wavelength dispersion extending over a wide range can be compensated by adopting the chirped fiber grating, in which the wavelength of the reflected optical signal varies continuously in the longitudinal direction.

Unevenness of the levels of the optical signals reflected from the fiber gratings of the reflection type can be equalized by inserting the gain equalizer between the output terminal of the circulator and the optical transmission line. Moreover, some of the optical signals reflected from the fiber gratings of the reflection type, the power levels of which are lower than their rated values assigned by the level diagram, can be compensated by the optical repeater inserted between the circulator and the gain equalizer.

Since the wavelength dispersion compensator having the fiber gratings of the reflection type is provided for the optical transmission line, the insertion losses caused by increases of the dispersion compensations are lower than those of the conventional dispersion compensation fiber, and thereby the loss compensation amplifier becomes unnecessary, hence the cost prices of the optical transmission line and the wavelength dispersion compensator can be cut down.

Since the optical transmission system is composed of the plural wavelength dispersion compensators corresponding to the respective optical signals which are propagated through the optical transmission line and undergo the wavelength dispersions, the demultiplexing AWG which demultiplexes the WDM optical signals into the plural optical signals and supply them to the plural wavelength dispersion compensators respectively, and the multiplexing AWG which multiplexes the respective optical signals outputted from the plural wavelength dispersion compensators, the wavelength dispersions of the optical signals are compensated throughout a wide range of the wavelength by the plural wavelength dispersion compensators, each of which is suitably designed to serve as a compensator for an optical signal inputted thereto.

Moreover, since the Co doped fibers are inserted between the wavelength dispersion compensators and the multiplexing AWG, some of the optical signals outputted from the wavelength dispersion compensators, each having a high signal level, are propagated through the Co doped fibers, and undergo level losses, hence the signal levels of the respective optical signals can be equalized.

Moreover, since the optical amplifiers are inserted between the wavelength dispersion compensators and the multiplexing AWG, the optical signals, the wavelength dispersions accumulated on which have been compensated by the wavelength dispersion compensators, are so amplified by the optical amplifiers that the peak levels thereof are equalized, and transmitted to the multiplexing AWG, hence the deflections of the levels of the optical signals can be corrected easily.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A wavelength dispersion compensator for compensating wavelength dispersions of wavelength division multiplexed (WDM) optical signals which have been propagated through an input optical transmission line, comprising:
   plural fiber gratings of a reflection type which reflect said WDM optical signals at different positions depending on wavelengths of said reflected optical signals;
   a circulator comprising an input terminal and an output terminal, said input terminal being connected with said input optical transmission line, said input terminal and output terminal being in communication with said plural fiber gratings of a reflection type, and said output terminal being connected with one of an output optical transmission line and an output optical waveguide; and
   an optical repeater and a gain equalizer connected in series,
   wherein an input terminal of said optical repeater is connected with said output terminal of said circulator, an input terminal of said gain equalizer is connected with an output terminal of said optical repeater, and an output terminal of said gain equalizer is connected with one of said output optical transmission line and said output optical waveguide, and
   wherein a number of said plural fiber gratings which is at least equivalent to a number of said optical signals are connected in series.

2. An optical transmission line, comprising:
   plural wavelength dispersion compensators which compensate for a wavelength dispersion of a single optical signal;
   a demultiplexing arrayed waveguide grating (AWG) which demultiplexes wavelength division multiplexed (WDM) optical signals into plural optical signals, and supplies them to said plural wavelength dispersion compensators; and
   a multiplexing AWG which multiplexes said plural optical signals respectively outputted from said plural wavelength dispersion compensators,
   wherein said plural wavelength dispersion compensators comprises:
      a fiber grating of a reflection type for reflecting one of said plural optical signals; and
      a circulator) an input terminal of which is communicated with said demultiplexing AWG, an input and output terminal of which is communicated with said fiber grating of a reflection type, and an output terminal of which is communicated with said multiplexing AWG,
   wherein optical distances between said fiber gratings of a reflection type and said corresponding circulators comprise different values depending on wavelengths of said reflected optical signals in said plural wavelength dispersion compensators, and
   wherein a number of said plural wavelength dispersion compensators is at least equivalent to a number of said optical signals.

3. An optical transmission line according to claim 2, wherein said fiber grating of a reflection type of said plural wavelength dispersion compensators comprises a chirped fiber grazing of a reflection type.

4. An optical transmission line according to claim 2, further comprising:
   gain equalizers,
   wherein input terminals of said gain equalizers are respectively connected with said output terminals of said circulators, and output terminals of said gain equalizers are respectively communicated with said multiplexing AWG.

5. An optical transmission line according to claim 2, further comprising:
   optical repeaters connected with gain equalizers in series,
   wherein input terminals of said optical repeaters are respectively connected with said output terminals of said circulators, output terminals of said optical repeaters are respectively connected with input terminals of said gain equalizers, and output terminals of said gain equalizers are respectively communicated with said multiplexing AWG.

6. An optical transmission line according to claim 2, further comprising:
   Co doped fibers inserted between said wavelength dispersion compensators and said multiplexing AWG.

7. An optical transmission line according to claim 2, further comprising:
   optical amplifiers respectively inserted between said wavelength dispersion compensators and said multiplexing AWG.

8. A wavelength dispersion compensator for compensating wavelength dispersions of wavelength division multiplexed (WDM) optical signals which have been propagated through an input optical transmission line, comprising:
   plural fiber gratings of a reflection type which reflect said WDM optical signals at different positions depending on wavelengths of said reflected optical signals; and
   an optical repeater and a gain equalizer connected in series, and receiving an output from said plural fiber gratings,
   wherein a number of said plural fiber gratings which is at least equivalent to a number of said optical signals are connected in series.

9. An optical transmission line, comprising:

a demultiplexing arrayed waveguide grating (AWG) which demultiplexes wavelength division multiplexed (WDM) optical signals into plural optical signals; and plural wavelength dispersion compensators, each of which receives a single optical signal of said plural optical signals and compensates for a wavelength dispersion of said single optical signal, said plural wavelength dispersion compensators comprising:

a fiber grating of a reflection type for reflecting one of said plural optical signals; and a circulator, an input terminal of which is communicated with said demultiplexing AWG, an input and output terminal of which is communicated with said fiber grating of a reflection type, and an output terminal of which is communicated with said multiplexing AWG, wherein a number of said plural wavelength dispersion compensators is at least equivalent to a number of said optical signals.

* * * * *